United States Patent

[11] 3,633,457

[72] Inventors Rudolf Reeber
Neukeferloh;
Horst Lanzenberger, Munich, both of Germany
[21] Appl. No. 863,786
[22] Filed Oct. 6, 1969
[45] Patented Jan. 11, 1972
[73] Assignee Friedrich Deckel Prazision, Mechanik & Maschinenbau
Munich, Plingansesstrasse, Germany

[54] DEVICE FOR SECURING AND RELEASING OF WORKTOOLS IN A WORKTOOL MACHINE SPINDLE
10 Claims, 6 Drawing Figs.
[52] U.S. Cl. .................................................. 90/11 A
[51] Int. Cl. .................................................. B23c 9/00
[50] Field of Search ................................... 90/11 A; 77/3; 279/1 H, 9.1

[56] References Cited
UNITED STATES PATENTS
3,220,313  11/1965  Schroeder .................. 90/11 A
3,254,567  6/1966  Daugherty .................. 90/11 A Primary Examiner—Gil Weidenfeld
Attorney—Woodhams, Blanchard and Flynn ABSTRACT: Electric motor and gearing means for securing and releasing of worktools in the spindle of a machine tool. The motor drives through suitable reduction gearing a planet carrier which is connected simultaneously to two sun gears. One sun gear is connected to a drawbar for screwing and unscrewing same into and off from the tool. The other sun gear is connected to means responding to rotation of said last-named sun gear for applying sufficient tension to said drawbar to set its threads with sufficient force against the threads of the tool to assure against accidental unscrewing of such tool from the drawbar. The parts are arranged so that the first-mentioned sun gear operates to apply said tensioning force sufficient to prevent unscrewing of said tool from the drawbar. Release of the tool is accomplished first by releasing said tensioning force following by unscrewing of the drawbar from the tool.

INVENTORS
RUDOLF REEBER
HORST LANZENBERGER
BY Woodhams, Blanchard & Flynn
ATTORNEYS 3,633,457

DEVICE FOR SECURING AND RELEASING OF WORKTOOLS IN A WORKTOOL MACHINE SPINDLE

The invention relates to a device for the securing and releasing of work tools in the spindle of a machine tool which for this purpose has a special electric chuck motor. Such devices normally use a high-speed electric motor for the required large torque, which electric motor has correspondingly small dimensions, in association with gearing which greatly reduces the speed of the motor. The output of such gearing is normally connected to the draw spindle engaging the work tool by suitable threading. One preferred gearing for this purpose is a form of planetary reduction gearing having two sun gears, the planet gear carrier of which is driven by the motor and the two sun gears of which are connected to the work tool spindle and to a drawbar, which latter is coaxial to said work tool spindle and is provided with a draw-in screw thread for the work tool.

In the motor drive of such clamping devices special measures are required by the fact that the torque required for releasing the clamped work tool is greater than the torque used for clamping the work tool. In the past, this has been achieved in different ways. Either the maximum torque provided by the chuck motor is changed in an electrical manner by varying the exciter currents or main currents in the two directions of rotation or a mechanical coupling is connected behind the motor which mechanical coupling transmits selected torques in both directions of rotation.

The invention approaches the problem in a new manner by removing the tension produced during the clamping before the releasing so that the friction existing in the draw-in screw thread is removed as the cause of the increased release torque.

In one of the clamping devices with a planet gear stepdown gearing, the invention provides that one of the two sun gears of the gearing is rotatably supported on the member (work tool spindle or drawbar) associated therewith in a zone defined by stops and is axially movably supported through screw means, whereby the angle of inclination of the screw means is positioned in the self-locking zone below the angle of friction and above the angle of inclination of the draw-in screw thread. The invention further provides an axially acting tension spring between said one sun gear and the member (drawbar or work tool spindle) supporting the other sun gear. Due to the fact that the angle of inclination of the screw means which transform the limited rotation of the sun gear opposite the member associated therewith into a limited axial movement lies close to the upper limit of the self-locking, during the release movement of the sun gear this axial movement, which is effected during clamping before the tensioning of the bias spring in the one direction, is first reversed and through this the bias spring is released. The releasing of the draw-in thread of the drawbar from the work tool, the inclination of which lies far below the self-locking limit, is then done very easily without any pretensioning and requires a torque which is much less than the torque required for clamping.

In a preferred embodiment of the invention, the axially movable sun gear consists of a casing provided with the screw means and a ring gear axially guided on the casing. Axial movement is limited to the casing while the ring gear maintains its axial position in the planetary gearing.

In the casing provided with screw means a set of springs is provided as a tension spring, the path of work of which is at most equal to the zone of the axial movement of the casing on the screw surfaces. It is thus assured that the tension spring is at all times completely released during releasing.

Also for the other sun gear, for example, the sun gear associated with the drawbar, a splined shaft or similar rotationally fixed connection is advantageously provided, which connection nevertheless enables the axial position of the ring gear to be independent of the axial position of the drawbar.

Since, as above discussed, the screw means, critical for the releasing of the clamping device, have an inclination which is close to the limit of self-locking, the torque required for the releasing thereof is vary small. This can lead to difficulties if a chuck motor is used, the stator of which is arranged coaxially to the work tool spindle and is rotationally fixedly connected therewith and the rotor of which acts through suitable gearing means to drive the drawbar for the work tool. Namely, it is then possible upon a sudden starting of the work tool spindle that the rotor and the gearing parts connected therewith, which parts must be brought to the same speed as the work tool spindle and the stator connected thereto, will exert a torque which, based on their moment of inertia, serves in the device of the invention to release the spring tension.

In order to avoid such torques in clamping devices with a chuck motor rotating with the work tool spindle, according to a further characteristic of the invention, a gear is provided in the train of the gear means driven by the motor, said gear reversing the direction of rotation of said gear means, whereby the moments of inertia of the oppositely directed connected gear means, when reduced onto the shaft of the reversing gear, are substantially the same. Both connected groups of oppositely directed gear means maintain at all times a balance at the reversing gear or gears during starting and during braking of the work tool spindle so that no torque acts onto the drawbar.

For an easier adjustment of the moments of inertia of the oppositely directed but connected gear means, a rotatable disk can be arranged on the rotor, the moment of inertia of said rotatable disk being selectively adjustable by symmetrically arranged bores or additional materials.

If a clamping device of the above-described construction has a planet gear carrier, then advantageously several reversing gears are arranged circularly on a ring fixedly connected to the work tool spindle, which reversing gears engage at diametral points a central gear of the drive motor and the internal toothing of the planetary gear carrier.

Further characteristics of the invention can be understood from the description of one exemplary embodiment in connection with the drawings, in which.

Figure 2:
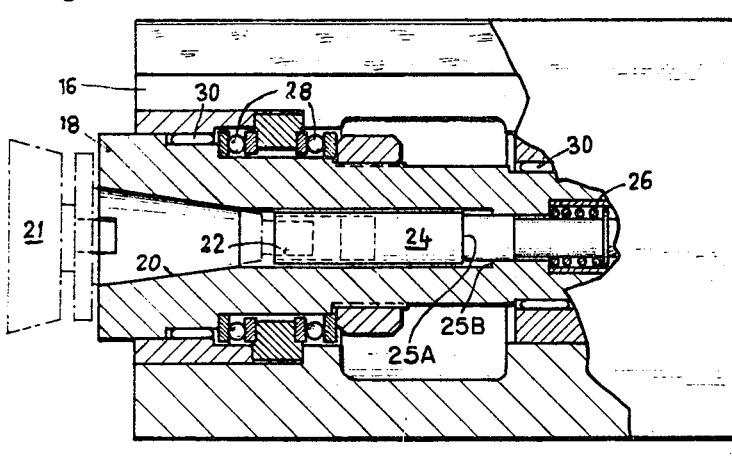
Figure 4:
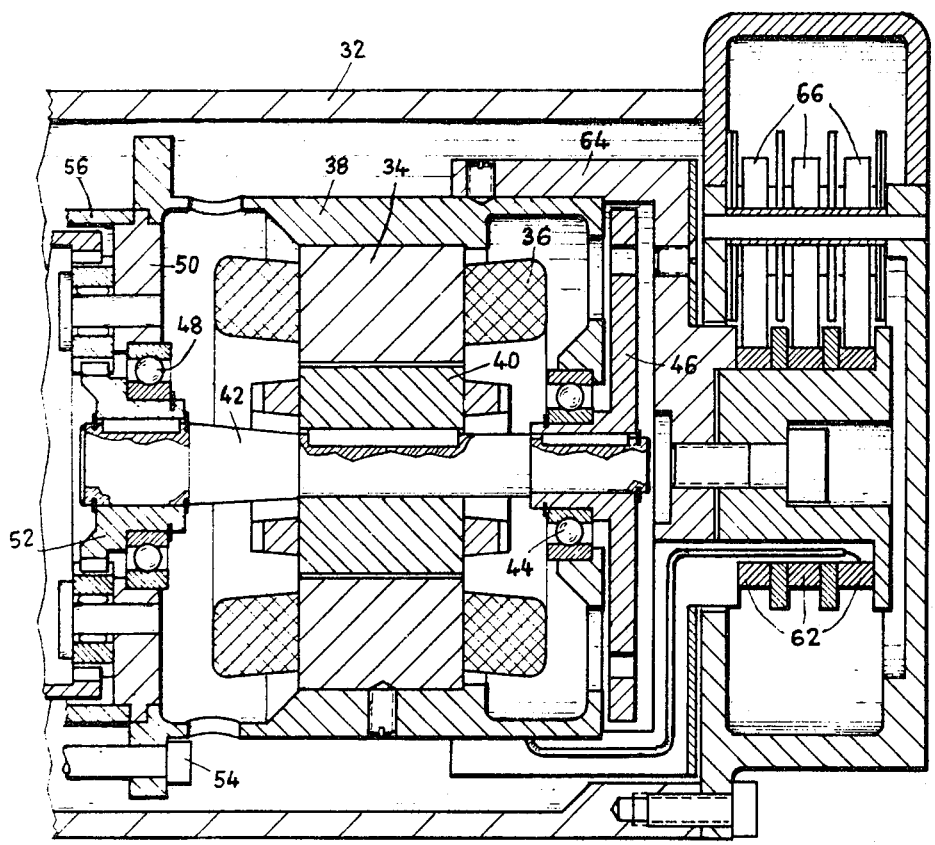
Figure 5:
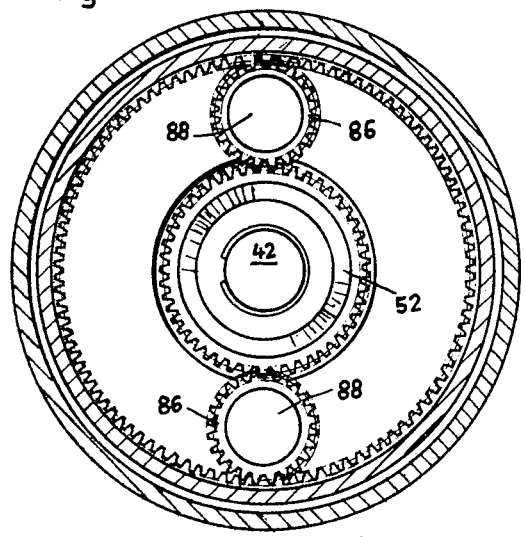
FIG. 5 is a cross-sectional view according to the line V—V of FIG. 3.
Figure 6:
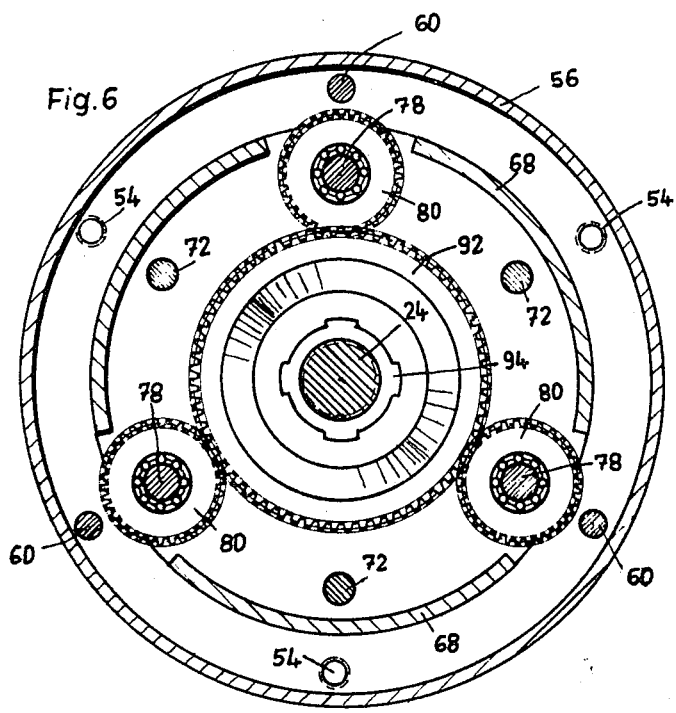
FIG. 6 is a cross-sectional view according to the line VI—VI of FIG. 3.

A carriage 12 is guided vertically movably at the base 10 of a milling machine, said carriage supporting a table 14 for clamping the workpieces thereon. A headstock 16 with a horizontal spindle is horizontally movable on the upper side of the base 10. The spindle 18 has (FIG. 2) a conical receiving means 20 for work tools 21 which are provided with a draw-in screw thread receivable into the threaded opening 22 of a drawbar 24 and is tightenable or releasable by rotating the drawbar. Upon releasing the work tool 21, the drawbar 24 becomes free so that it is pressed into its rightward limit position defined by the shoulder 25A on the drawbar 24 and the surface 25B on the spindle 18 by a spring 26. The spindle 18 is supported by radial ball bearings 30 and axial thrust bearings 28 in the headstock 16. It is driven a motor; the drive parts are not illustrated. The headstock 16 supports at its rearward end a motor drive for the drawbar 24 which is provided in a housing 32 which is tightly screwed to the headstock and of which the details are illustrated in FIGS. 3 to 6.

The drawbar drive has an electric motor, the stator 34 which is positioned with its winding 36 in the motor housing 38. The rotor 40 is supported with its shaft 42 in ball bearings. The right ball bearing 44 is positioned in the front wall of the housing 38 and is placed onto the hub of a rotatable inertia disk 46 which is fixedly connected to the shaft 42. The bearing support flange 50 is secured by means of screws 54 to a two-piece gear housing, both parts 56 and 58 of which are held together by screws 60. The lid-type housing portion 58 is rigidly connected to the spindle 18. If the spindle 18 is driven, the gear housing 56, 58 and the motor housing 38 with the winding 36 rotate also with said spindle 18. The current supply to the winding therefore takes place through slide rings 62 which are arranged on a cup-shaped cap 64 (FIG. 4) which in turn is secured to the motor housing 38. The slide brushes 66 associated with the slide rings 62 are positioned tightly on the housing 32 connected to the spindle headstock 16.

The gear housing 56, 58 encloses a differential stepdown gearing. Same consists of a two-piece planet gear carrier, the two parts 68 and 70 of which are held together by screws 72. The planet gear carrier is supported on ball bearings 74 or 76 in the housing 56, 58, contains planet gears 80 rotatably mounted on pins 78 and supports by screws 82 an internally toothed ring gear 84. This internal toothing engages reversing gears 86 which are supported in the bearing-supporting flange 50 by pins 88. The reversing gears 86 connect the planet gear carrier 68, 70 to the drive gear 52 in such a manner that a rotation of the rotor 40 in the stator 34 is transferred to the planet gear carrier 68, 70 with a reduction of speed corresponding to the number of teeth of the gear 52 and of the ring gear 84 and with a reversal of the direction of rotation. Upon rotation of the spindle 18, in which rotation, as above mentioned, the gear housing 56, 58 and the motor housing 38 with the stator 34 and the bearing-supporting flange 50 participate, the reversing gears 86 at its outer side drives the planet gear carrier 68, 70 and the parts connected therewith including the drawbar 24 and at its inner side the drive gear 52 and the parts connected therewith including the rotating disk 46. The polar moments of inertia of the two subgroups are chosen so that they, in reference to the pins 88 of the reversing gears 86, are substantially the same so that at the start of the spindle 18, the accelerative forces at the diametral points of engagement at the reversing gears 86 are the same in direction and magnitude. The drive gear 52 and the planet gear carrier 68, 70 thus maintain their positions relative to one another because the forces on both sides of the gears 86, for acceleration during starting or for retardation during braking, whatever they may be, cancel each other. A sun gear 92 is rotatably supported in the ring gear 84 by means of ball bearings 90, the bore of said sun gear having inwardly projecting spline parts in which a splined sleeve 94 is axially movable. Said sleeve is secured to the drawbar 24 by means of a thread and a pin 96. The sun gear engages the planet gears 80 with external teeth, as does the second sun gear 98 of the differential gearing, a housing 102 being connected to said second sun gear in rotatably fixed and axially movable relationship through a key 100. Both sun gears 92 and 98 have a slightly different number of teeth so that they are driven at a substantially geared-down speed in opposite rotative directions during the start of the planet gear carrier. The casing 102 contains a set of cup springs 104 which act through axial thrust bearings 106 onto the sleeve 94 and thus onto the drawbar 24. On the other side, the casing 102 is connected to the sleeve 110 through a thread 108, which sleeve 110 is tightly secured in the horizontal spindle 18 by means of screw threads. Rotation of the casing 102 on the sleeve 110 is limited by a pin 112 which engages the groove of a flange 114 connected to the sleeve 110. The thread between these two parts has an angle of inclination $\alpha$ which is positioned in the self-locking zone closely below the angle of friction $\rho$.

Figure 1:
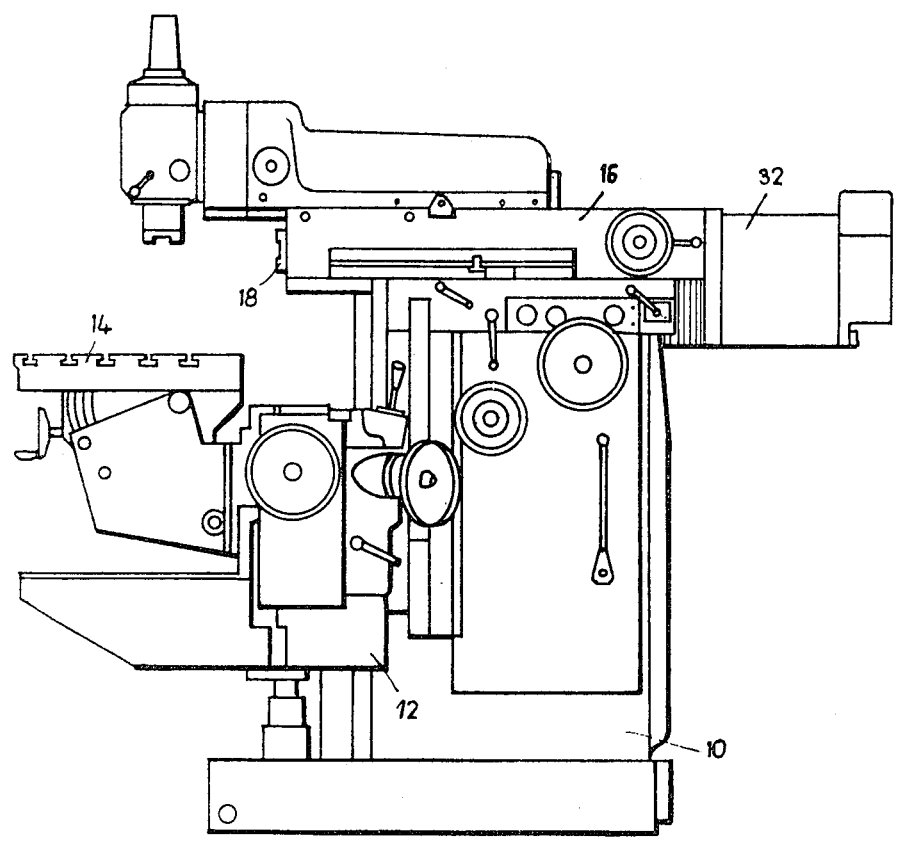
FIG. 1 is a side-elevational view of a milling machine.
Figure 3:
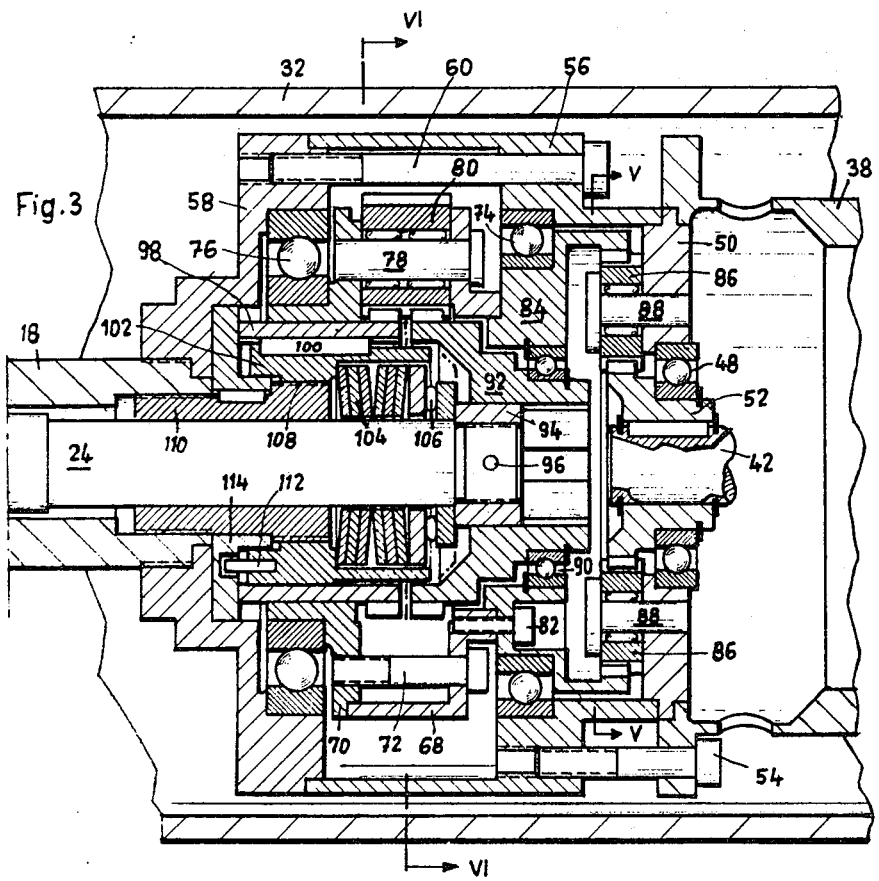
FIGS. 2 to 4 are cross-sectional views of the headstock of the milling machine presented as three successively adjacent parts.

FIG. 3 illustrates the device in the loaded condition. The casing 102 is shown in its right position and, as a consequence, the casing on the sleeve 110 has been rotated and, by the thread 108, has axially been screwed to the right. Thereby the springs 104 are compressed and apply a tensile stress onto the drawbar 24 through the axial thrust bearing 106 and the sleeve 94 through which tensile stress the tool 21, which is screwed into the threaded opening 22 (FIG. 2) due to a rotation of the drawbar 24, is pulled tightly into the receiving cone. If the rotor 40 of the chuck motor is driven for loosening the work tool, it rotates the planet gear carrier 68, 70 through the gear 52, the reversing gears 86 and the ring gear 84, through which both sun gears 92 and 98 are driven independently of each other. The sun gear 92 at first generates a considerable resistance against this movement because the drawbar 24 connected to it is held by the friction resulting from the spring tension in the threaded opening 22 by the work tool 21. Compared to this, the resistance of the sun gear 98 is considerably less because in the thread 108, the spring tension is effective only with the factor $tg\ (\rho-\alpha)$; this factor is very small since $\alpha$ is only a little smaller than $\rho$. At the start of the planet gear carrier the sun gear 92 at first does not rotate but only the sun gear 98 rotates by which the casing 102 moves leftwardly on the sleeve 110. This completely unloads the set of springs 104. When the casing reaches its left limit position, it is prevented from further rotation by the pin 112 so that now only the sun gear 92 can rotate. The torque required therefore is considerably less than before because by unloading the set of springs 104 the tensile stress and, therefore, the friction in the thread of the work tool 12 is released. The drawbar 24 can therefore be easily unscrewed from the thread of the work tool 21.

At the insertion and clamping of a work tool, the process is reversed. In such case, the drawbar 24 first moves rightwardly unhindered by the spring 26 so that the casing 102 can be rotated through the sun gear 98 on the thread 108 and can be moved rightwardly together with the set of springs without the springs being tensioned thereby. The sun gear 92 will not rotate due to the friction between the surfaces 25A and 25B. In the right limit position a further rotation of the casing 102 is prevented by the pin 112, so that now upon a standstill of the sun gear 98, the friction between surfaces 25A and 25B is overcome and the sun gear 92 and thus the drawbar 24 will rotate. With the advance of the work tool 21 into the cavity 20, the clamping torque increases due to a leftward movement of the drawbar to compress the spring 104 until the rotor 40 is stalled when the limit torque is reached. A particularly strong clamping of the work tool is accomplished by the rotative moment of the rotating disk 46. The motor is preferably then automatically turned off by an overload relay.

It has been proven to be advantageous to supply the sun gear 98 with a larger amount of teeth than the sun gear 92 because the rotational speed of the planet gear carrier 68, 70 on the casing 102 is geared down at a greater ratio than on the drawbar 24. On the other hand, the casing 102 receives a greater torque than the drawbar 24 which is desirable in order to operate with certainty, both during the release and during the clamping of the workpiece, first the casing 102 and then, when the rotation of the casing is blocked by the pin 112, the drawbar. Furthermore, in the stated gearing relationship of both sun gears, there is obtained between the planet gear carrier and the sun gear 98 a rotation in the same direction but for the sun gear 92, the rotation is in the opposite direction.

The embodiments of the invention in which an exclusive property or privilege is claimed are defined as follows:

1. A device for securing and releasing of work tools with respect to the spindle of a machine tool in response to a rotative movement in respectively opposite directions by a source of rotative force, comprising in combination:
   a work tool driving spindle mounted for rotation and connectable to means for driving same;
   a drawbar extending centrally through said spindle and provided with threaded means for attachment to a tool;
   a planet gear carrier carrying planet gears thereon and mounted for rotation and means associating said source of rotative force with said planet gear carrier for driving said planet gear carrier;
   a pair of sun gears mounted for rotation independently of each other but in mesh with said planet gears for operation of both thereby;
   means connecting said drawbar to one of said sun gears for rotation thereby;
   releasable bias means for applying an axial load onto said drawbar;
   load means responsive to rotation of the other of said sun gears for releasing said axial load of said releasable bias means upon a rotation of said other of said sun gears in a first direction;

limit means limiting the amount of movement of said load means in the direction of applying or releasing of said axial load;

the said load means normally having an internal resistance that upon initial rotation of said planet gear carrier, said other of said sun gears will rotate first in said first direction to move said load means against said limit means to release said axial load of said releasable bias means after which said one of said sun gears will rotate to release said tool.

2. A device according to claim 1, wherein said load means comprises a screw thread connection between said limit means and said other of said sun gears.

3. A device according to claim 1, wherein said load means includes casing means having an internally threaded portion thereon and a sleeve secured to said spindle having an externally threaded portion thereon engaged with said internally threaded portion of said casing means;

including coupling means for coupling said casing means to said other of said sun gears for rotative movement therewith while permitting a relative longitudinal movement therebetween.

4. A device according to claim 3, wherein said drawbar includes stop means on the end thereof adjacent said connecting means; and wherein said releasable bias means includes a spring mounted between said casing means and said stop means.

5. A device according to claim 4, wherein said connecting means includes a splined connection between said one of said sun gears and said drawbar whereby a rotation of said one of said sun gears and said drawbar will cause said drawbar to move toward said spring to compress said spring between said stop means and said casing means and to thereby tighten said tool onto said spindle to secure said tool against release.

6. A device according to claim 3, wherein said limit means includes a pin secured to said casing means and extending away therefrom and a recess provided in said sleeve for receiving the free end of said pin.

7. A device according to claim 1, wherein said one of said sun gears has a lesser number of teeth than said other of said sun gears.

8. A device according to claim 1, wherein said source of rotative force includes means defining an electric motor having a stator and a rotor coaxial therewith, said stator being arranged coaxially of and connected to said spindle;

including transmission means for connecting said rotor to said sun gears; and wherein said transmission means includes at least a pair of reversing gears rotatably supported on shafts and drivingly coupled between said rotor and said planetary gear carrier;

said reversing gear being drivingly connected to said rotor on diametrically opposite sides thereof whereby the moments of inertia on said shafts supporting said reversing gears are equal.

9. A device according to claim 8, including a rotating disk secured to said rotor, said disk having symmetrically arranged bores arranged therein for balancing said moment of inertia.

10. A device according to claim 8, wherein said shafts are secured to said spindle.

* * * * *

UNITED STATES PATENT OFFICE
CERTIFICATE OF CORRECTION

Patent No. 3 633 457                    Dated January 11, 1972

Inventor(s) Rudolf Reeber and Horst Lanzenberger

It is certified that error appears in the above-identified patent and that said Letters Patent are hereby corrected as shown below:

1. Column 5, line 4; after "resistance", the words ---less than the frictional resistance of a tool firmly tightened against release in said spindle--- should be added.

2. Column 5, line 10; after "tool" the words ---and upon a rotation of said planet gear carrier in the opposite direction, said other of said sun gears will rotate first in a second direction opposite to said first direction to move said load means against said limit means and thereafter said one of said gears will rotate to thereby effect a tightening of said drawbar onto said tool and applying said axial load to thereby anchor said tool firmly against release from said drawbar and said spindle.--- should be added.

Signed and sealed this 11th day of July 1972.

(SEAL)
Attest:

EDWARD M. FLETCHER, JR.
Attesting Officer

ROBERT GOTTSCHALK
Commissioner of Patents